United States Patent
He et al.

[11] Patent Number: 6,043,997
[45] Date of Patent: *Mar. 28, 2000

[54] TWO STAGE, THREE-PHASE BOOST CONVERTER WITH REDUCED TOTAL HARMONIC DISTORTION

[75] Inventors: Jin He, Plano; Mark E. Jacobs, Dallas, both of Tex.

[73] Assignee: Lucent Technologies Inc., Murray Hill, N.J.

[*] Notice: This patent is subject to a terminal disclaimer.

[21] Appl. No.: 09/133,105

[22] Filed: Aug. 12, 1998

[51] Int. Cl.[7] .................................................. H02M 1/14
[52] U.S. Cl. ................................ 363/44; 363/89; 323/222
[58] Field of Search ............................ 323/222; 363/440, 363/89, 126

[56] References Cited

U.S. PATENT DOCUMENTS

| | | | |
|---|---|---|---|
| 5,414,613 | 5/1995 | Chen | 363/89 |
| 5,446,646 | 8/1995 | Miyazaki | 363/89 |
| 5,506,766 | 4/1996 | Takahashi | 363/89 |
| 5,654,882 | 8/1997 | Kanazana et al. | 363/89 |
| 5,793,625 | 8/1998 | Balogh | 323/222 |
| 5,886,891 | 3/1999 | Jiang et al. | 363/89 |

OTHER PUBLICATIONS

Y. Jiang, et al. "Simple High Performance Three–Phase Boost Rectifiers", Dec. 1994 VPEC Seminar Proceeding, pp. 39–44.

A.R. Prasad, P.D. Ziogas, and S. Manias, "An Active Power Factor Correction Technique for Three–Phase Diode Rectifiers", Sep. 1989 IEEE PESC Proceedings, pp. 58–66.

E. Ismail & R.W. Ericson, "A Single Transistor Three–Phase Resonant Switch for High Quality Rectification", Mar. 1992 IEEE PESC Proceeding, pp. 1341–1351.

R. Zhang & F.C. Lee, "Optimum PWM Pattern for a 3–Phase Boost DCM PFC Rectifier", Dec. 1996 VPEC Annual Seminar Proceeding, pp. 35–42.

*Primary Examiner*—Jeffrey Sterret

[57] ABSTRACT

For use with a three-phase boost converter having a primary stage with a primary rectifier and a primary boost switch coupled between an input and output of the three-phase boost converter, an auxiliary stage, method of reducing input current total harmonic distortion (THD) at the input of the three-phase boost converter, and a three-phase boost converter employing the auxiliary stage and method. In one embodiment, the auxiliary stage includes first, second and third auxiliary boost inductors coupled to corresponding phases of the input. The auxiliary stage also includes an auxiliary boost switch, interposed between the first, second and third auxiliary boost inductors and the output, that conducts to draw corresponding phase currents through the first, second and third auxiliary boost inductors thereby reducing input current THD at the input of the three-phase boost converter.

15 Claims, 6 Drawing Sheets

TWO STAGE, THREE-PHASE BOOST CONVERTER WITH REDUCED TOTAL HARMONIC DISTORTION

TECHNICAL FIELD OF THE INVENTION

The present invention is directed, in general, to power conversion and, more specifically, to a three-phase boost converter having a primary and an auxiliary stage and a method of reducing total harmonic distortion (THD) at the input of the boost converter.

BACKGROUND OF THE INVENTION

Poor input power factor and high input current total harmonic distortion (THD) generated by phase controlled and uncontrolled diode bridge rectifiers are well known problems in the power converter/rectifier industry today. Such low power factor and high THD commonly lead to input AC voltage distortions, distribution system losses, neutral harmonic currents and excitation of system resonances. To combat these problems, designers have attempted to develop improved three-phase rectifiers or converters which draw nearly sinusoidal line currents with low harmonic content and with high displacement power factor.

Three major power factor and harmonic current improvement approaches are commonly used in the industry. For medium to high power applications, AC/DC rectifiers (utility interface) often employ six-active-switch boost rectifiers. By using the proper modulation techniques for the six switches, it is possible to control the rectifier output voltage while maintaining nearly sinusoidal input line currents at unity power factor. However, this approach experiences limitations such as high system costs due to the need for a complex pulse-width modulation (PWM) control scheme for the six active power switches and associated drive circuitry.

Another approach for power factor and harmonic current improvement includes the use of three single-phase power factor correction (PFC) isolated AC/DC rectifiers. Such a configuration is more attractive than the previous approach because of a reduced number of active switches. The three single-phase PFC isolated AC/DC rectifiers, however, require three isolated high frequency DC/DC converters and, hence, it is still an expensive and complex PFC approach.

A single-switch, discontinuous conduction mode (DCM) three-phase boost PFC converter with six-diode bridge rectifier has been proposed and immediately drew interest due to its simplicity and low cost. This scheme illustrates that three-phase, low harmonic rectification is possible without either the use of large, low frequency passive elements or multiple active power switches and complex control. However, since such a topology and control scheme originates from a single-phase counterpart, it suffers from the same problems as its single-phase counterpart, namely, high switch peak-current stress, a requirement of fairly large electromagnetic interference (EMI) filters and a very high DC bus voltage for lowering the THD.

Although a sinusoidal peak current can be obtained by simply applying constant duty cycle control, the average input line current is not sinusoidal due to the non-proportional inductor discharging interval, which results in a relatively high input current THD. To lower the input current THD, the non-proportional discharging interval can be alleviated by increasing the DC bus voltage (i.e., increasing the voltage transfer ratio), which, in turn, increases the switch voltage stress and cost. In practice, designers have demonstrated that, even though problematic, the single-switch three-phase DCM boost converter is suitable for low cost, low power, medium performance three-phase AC/DC applications such as telecommunication applications due to its low cost, simple circuitry and simple control requirements.

Today, the power supply industry for telecommunication systems and the like has become very cost-sensitive, with low production costs being a key to success. Additionally, the three-phase system THD requirement for telecommunication applications varies. Typically, the international market THD requirement for a three-phase AC/DC rectifier is often about 20%. While for the domestic market, the THD requirement for a three-phase rectifier system is often below 40%. Since the single-switch three-phase boost converter is operated in continuous conduction mode (CCM), the power switch stresses, DC bus voltage level, EMI filter size and rectifier costs are lessened. Therefore, a commercial three-phase rectifier can have a lower parts count at a reduced cost. Unfortunately, the drawback to such a power conversion approach is that relatively high THD (32%) and relatively low power factor (0.92–0.95) are experienced.

Accordingly, what is needed in the art is a cost effective three-phase power conversion topology that achieves an increased power factor and reduced input current THD.

SUMMARY OF THE INVENTION

To address the above-discussed deficiencies of the prior art, the present invention provides, for use with a three-phase boost converter having a primary stage with a primary rectifier and a primary boost switch coupled between an input and output of the three-phase boost converter, an auxiliary stage, a method of reducing input current total harmonic distortion (THD) at the input of the three-phase boost converter, and a three-phase boost converter employing the auxiliary stage and method.

In one embodiment, the auxiliary stage includes first, second and third auxiliary boost inductors coupled to corresponding phases of the input. The auxiliary stage also includes an auxiliary boost switch, interposed between the first, second and third auxiliary boost inductors and the output, that conducts to induce corresponding phase currents through the first, second and third auxiliary boost inductors thereby reducing input current THD at the input of the three-phase boost converter.

The present invention introduces the broad concept of employing an auxiliary stage in a three-phase boost converter to reduce input current THD at the input of the converter by shaping the input current into a substantially sinusoidal waveform. In addition to providing satisfactory power factor correction, the three-phase boost converter exhibits low THD characteristics. The auxiliary boost switch of the auxiliary stage occasionally conducts to provide currents in all three phases of the input to reduce the input current THD. The operation of the auxiliary stage provides additional advantages such as reducing the current stresses on the active switches of the three-phase boost converter.

In one embodiment of the present invention, the auxiliary boost switch transitions to a conducting state concurrently with the primary boost switch. The auxiliary boost switch therefore may transition to a conducting stage at or near the time that the primary boost switch transitions to a conducting state. In related but alternative embodiments, the auxiliary switch may transition to a nonconducting state before, concurrently or after the primary boost switch transitions to a nonconducting state.

In one embodiment of the present invention, the auxiliary stage further includes an auxiliary rectifier coupled between the first, second and third auxiliary boost inductors and the auxiliary boost switch. In an advantageous embodiment, the primary and the auxiliary rectifiers may be bridge rectifiers that may employ diodes as elements. In a related but alternative embodiment, the auxiliary stage further includes an auxiliary boost diode coupled between the auxiliary boost switch and the output. In another related but alternative embodiment, the primary stage further includes a primary boost inductor and primary boost diode coupled between the primary rectifier and the output.

In one embodiment of the present invention, the primary rectifier includes a six-diode bridge. Of course, any rectifier topology is well within the broad scope of the present invention.

In one embodiment of the present invention, the three-phase boost converter further includes an input filter. In an embodiment to be illustrated and described, the input filter includes an inductor and capacitor network. Any filter, however, is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
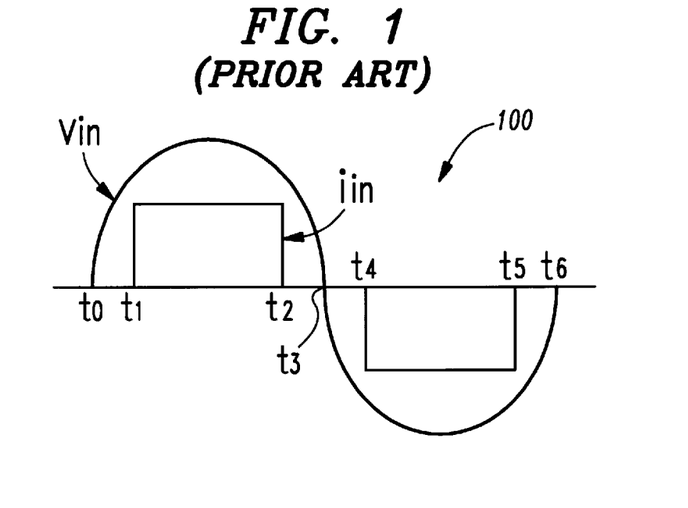
FIG. 1 illustrates an input waveform for a prior art single-switch three-phase CCM boost converter.

Referring initially to FIG. 1, illustrated is an input waveform for a prior art single-switch three-phase continuous conduction mode (CCM) boost converter. The waveform 100 includes both an input voltage component Vin and an input current component Iin. The input voltage Vin is shown as a typical sinusoidal wave, whereas the input current Iin appears as a clipped non-continuous conduction square wave. The input current Iin preferably should appear as a sinusoidal wave with no phase shift from the input voltage Vin. Unfortunately, input line current harmonic distortion, or total harmonic distortion (THD), caused by the CCM boost converter, forces the input current Iin to be clipped into the present form, thus reducing the overall power factor. As can be seen, during four time segments of the line frequency cycle, namely, time segments t0–t1, t2–t3, t3–t4, t5–t6, there are transitions from zero current to positive current to zero current to negative current to zero current. During these segments, ample current harmonics are generated, consequently harming the power supply system. By reducing or eliminating the zero-current time segments or by shaping the input current Iin into a sinusoidal-like form, the current THD can be reduced.

Figure 2:
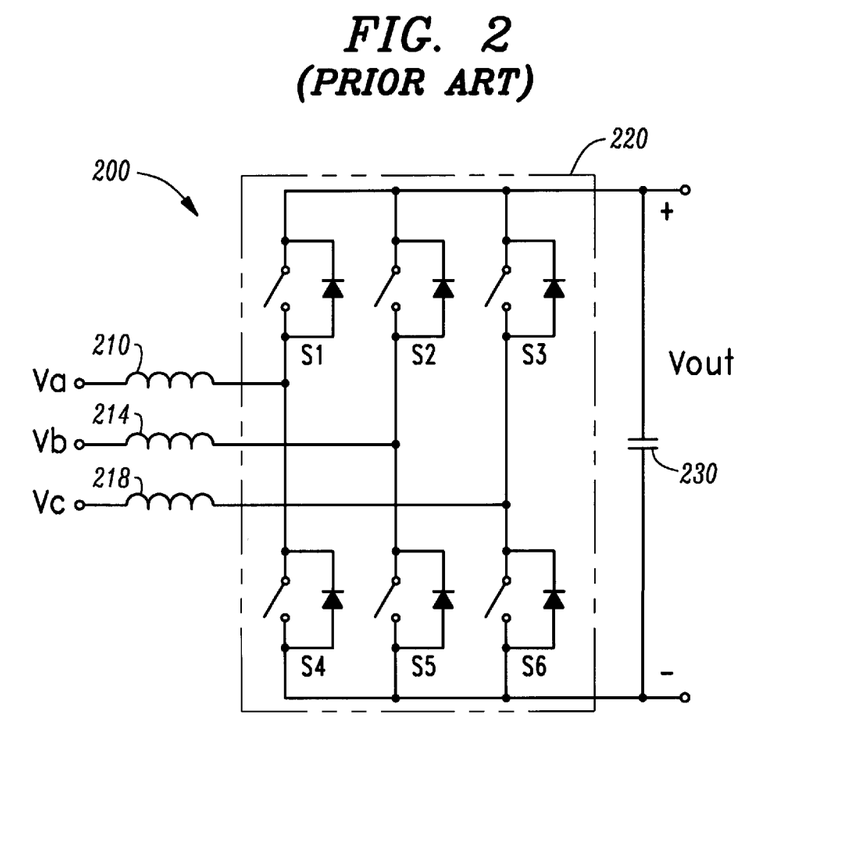
FIG. 2 illustrates a prior art six-switch three-phase PFC boost converter.

Turning now to FIG. 2, illustrated is a prior art six-switch three-phase PFC boost converter 200. The converter 200 receives input power from a AC voltage source with three phases (illustrated as connected to phase voltages Va, Vb, Vc) through first, second and third boost inductors 210, 214, 218, respectively. The input inductors 210, 214, 218 are also coupled to a three-phase active switch bridge rectifier 220. The three-phase rectifier 220 includes six active power switches S1–S6 arranged in a bridge configuration. Finally, an output capacitor 230 is coupled across the rectifier 220 and thereacross is measured an output voltage Vout.

Though relatively successful, this configuration contains numerous inherent problems concerning switching control and production costs. In order to control all six switches, a complex PWM control scheme must be employed. Further, in addition to problematic control requirements, this topology results in high costs due to the large number of components, associated drive circuitry and heat removal devices (i.e., heat sinks).

Figure 3:
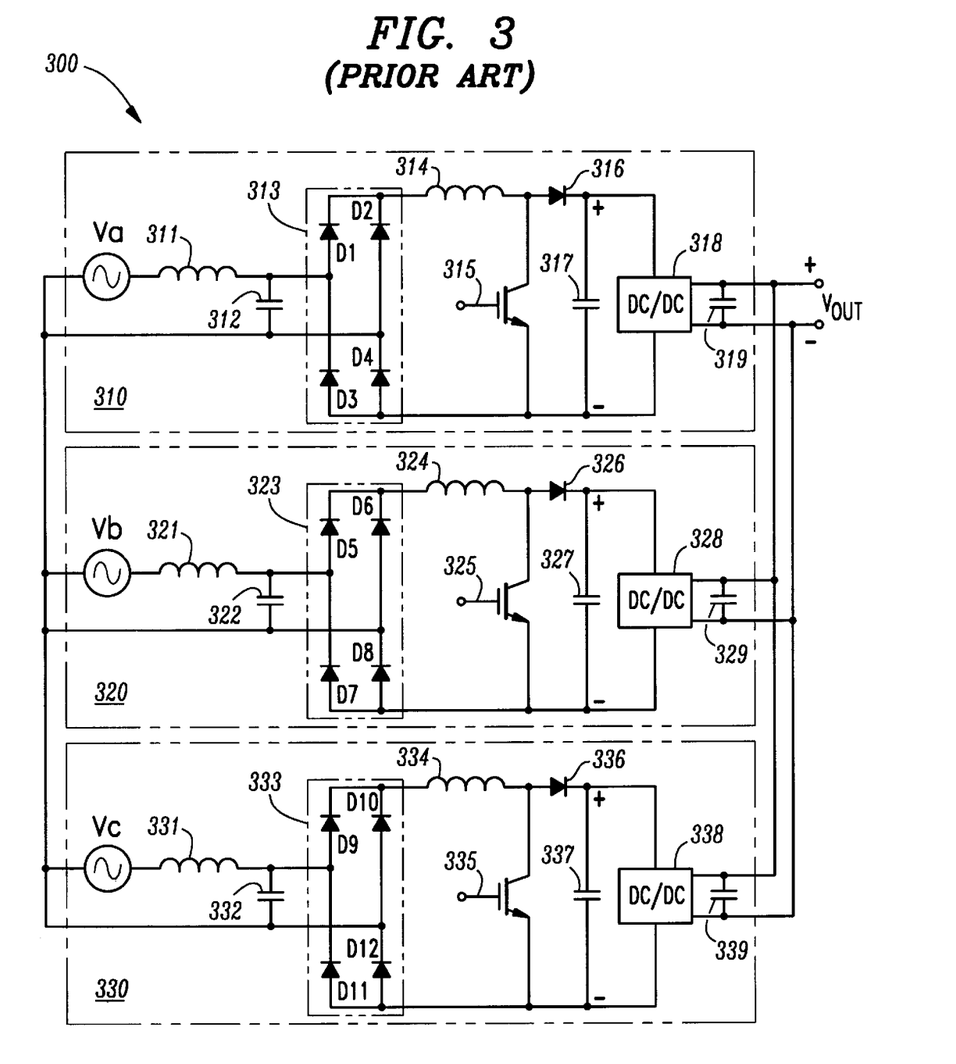
FIG. 3 illustrates a prior art PFC converter employing three single-switch, single-phase isolated AC/DC rectifier stages.

Turning now to FIG. 3, illustrated is a prior art PFC converter 300 employing three single-switch, single-phase isolated AC/DC rectifier stages 310, 320, 330. The first stage 310 includes a first AC power source Va coupled to an EMI filtering inductor 311 that is further coupled to an input capacitor 312. The filter inductor 311 is further coupled to a single-phase full wave rectifying diode bridge D1–D4. A boost inductor 314 is coupled between the diodes D1–D4 and a boost switch 315. A boost diode 316 is also coupled to the boost inductor 314 and to an output capacitor 317. A high frequency step-down DC/DC converter 318, including an output filter capacitor 319, is coupled across the boost capacitor 317.

The second and third stages 320, 330 are identical except that the second and third AC voltage sources Vb, Vc differ in phase (i.e., 120°) from the first AC voltage source Va and from one another. The output of the three stages 310, 320, 330 are then coupled to provide a isolated, regulated output voltage Vout.

This approach is more attractive than the previous circuit due, in part, to the use of three active power switches rather than six. Unfortunately, the problems associated with the previous prior art converter are still present. Rather than controlling six switches in a single stage, a designer must devise a scheme for controlling three switches in multiple stages of a single converter. Furthermore, in this topology, production costs are greater than in the previous converter due to a higher component count, especially in light the three required DC/DC stages.

Figure 4:
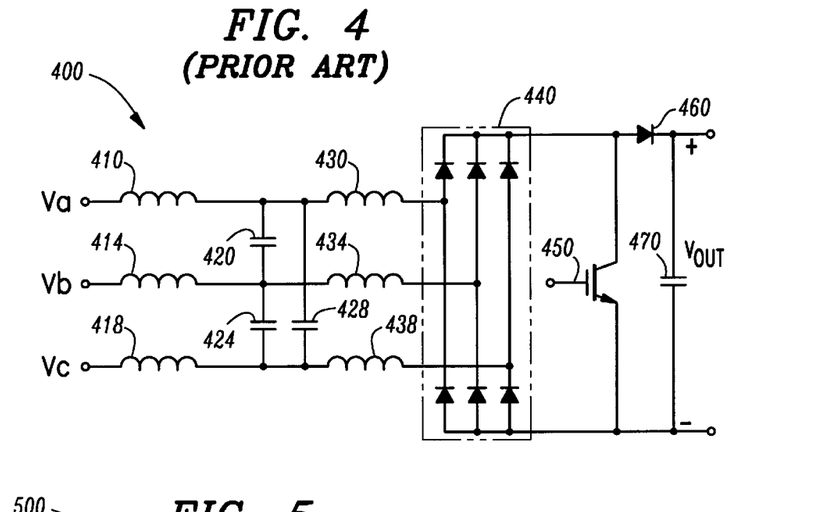
FIG. 4 illustrates a single-switch three-phase DCM boost converter.

Turning now to FIG. 4, illustrated is a prior art single-switch three-phase discontinuous conduction mode (DCM) boost converter 400. The converter 400 receives input power from an AC voltage source with three phases (illustrated as connected to phase voltages Va, Vb, Vc) through first, second and third EMI filter inductors 410, 414, 418, respectively. A first filter capacitor 420 is coupled between the first and second EMI filter inductors 410, 414 and a second filter capacitor 424 is coupled between the second and third EMI filter inductors 414, 418. Finally, a third filter capacitor 428 is coupled between the first and third EMI filter inductors 410, 418.

First, second and third boost inductors 430, 434, 438 are further coupled to the first, second and third EMI filter inductors 410, 414, 418, respectively. The first, second and third boost inductors 430, 434, 438 are coupled to a three-phase diode-bridge rectifier 440 that includes a plurality of diodes D1–D6 arranged in a full bridge configuration. Additionally, a boost power switch 450 is coupled in parallel with a series-coupled boost diode 460 and output capacitor 470 across the diode-bridge rectifier 440. An output voltage Vout is measured across the output capacitor 470.

This single-switch DCM converter became popular due to its simplicity and low production cost. In this topology, three-phase low harmonic rectification became possible without using either bulky low frequency passive elements or expensive multiple active power switches requiring complex control. Regrettably, since this setup originated from a single-phase structure and since the switch is opened at DCM, it also suffers from the same problems as its single-phase predecessor, such as a need for a large EMI filter (due to high peak currents), high switch peak-current stresses and very high DC bus voltage requirements to reduce the input THD.

Figure 5:
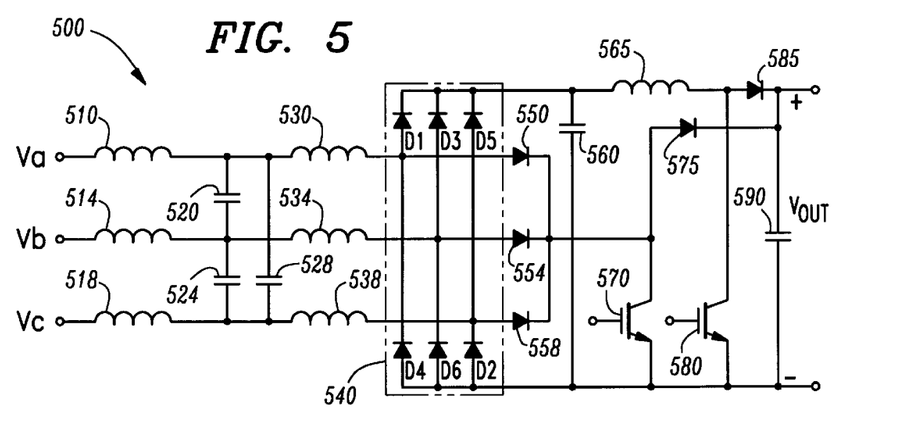
FIG. 5 illustrates an embodiment of a dual-switch, three-phase hybrid control PFC boost converter constructed according to the principles of the present invention.

Turning now to FIG. 5, illustrated is an embodiment of a dual-switch, three-phase PFC boost converter 500 constructed according to the principles of the present invention. The converter 500 receives input power from a AC voltage source with three phases (illustrated as connected to phase voltages Va, Vb, Vc) through first, second and third EMI filter inductors 510, 514, 518, respectively. A first filter capacitor 520 is coupled between the first and second EMI filter inductors 510, 514 and a second filter capacitor 524 is coupled between the second and third EMI filter inductors 514, 518. Finally, a third filter capacitor 528 is coupled between the first and third EMI filter inductors 510, 518. The first, second and third EMI filter inductors 510, 514, 518, together with the first, second and third filter capacitors 520, 524, 528, form an high frequency input filter.

First, second and third boost inductors 530, 534, 538 are further coupled to the first, second and third EMI filter inductors 510, 514, 518, respectively. The first, second and third boost inductors 530, 534, 538 are also coupled to a three-phase diode-bridge rectifier 540 that includes a plurality of diodes D1–D6 arranged in a full bridge configuration. Further, seventh, eight and ninth input diodes 550, 554, 558 are coupled to the first, second and third boost inductors 530, 534, 538.

The converter further includes fourth filter capacitor 560 that is coupled across the rectified DC bus. The fourth filter capacitor 560 acts not only as a filter, but also to store necessary energy. The seventh, eight and ninth input diodes 550, 554, 558 are coupled to an auxiliary boost switch 570 and an auxiliary boost diode 575. A primary boost inductor 565 is coupled to the bridge rectifier 540 and to a primary boost switch 580 and a primary boost diode 585. The auxiliary and primary boost diodes 575, 585 are both coupled to an output capacitor 590, across which, an output voltage Vout is regulated.

The operation of this converter may be illustratively described in terms of two stages. The first stage, a primary stage operating in CCM, in this embodiment, includes the primary boost switch 580, the primary boost diode 585, the primary boost inductor 565, the filter capacitor 560, the three-phase rectifier 540 and the output capacitor 590. The auxiliary stage operating in DCM, in this embodiment, includes the auxiliary boost switch 570, the auxiliary boost diode 575, the first, second and third boost inductors 530, 534, 538, the seventh, eight and ninth input diodes 550, 554, 558.

The primary stage produces a current waveform analogous to the input current waveform Iin shown in FIG. 1. The auxiliary stage functions to decrease the THD during the time segments when there is zero current in FIG. 1 (i.e., time segments t0–t1, t2–t3, t3–t4, t5–t6) by drawing currents in an attempt to shape the input current Iin into a sinusoidal form. Both switches 570, 580 are preferably switched at a fixed frequency and preferably turned on at the same time, but may be turned off at different times.

Since there are two controllable switches, there are at least four different operating modes, depending on the duty cycle of each switch 570, 580:

1) D2<D1: Both switches 570, 580 operate in DCM mode.

2) D2<D1: Primary switch 580 in CCM mode. Auxiliary switch 570 in DCM mode.

3) D2>D1: Both switches 570, 580 operate in DCM mode.

4) D2>D1: Primary switch 580 in CCM mode. Auxiliary switch 570 in DCM mode.

where D1 represents the duty cycle of the primary boost switch 580 and D2 represents the duty cycle of the auxiliary boost switch 570.

The auxiliary boost switch 570 most advantageously operates in a DCM mode, and consequently, the auxiliary boost diode 575 experiences no reverse recovery currents. Thus, the auxiliary stage experiences very low power losses. Since there are four possible operating modes, it is possible that the input current flowing through the first, second and third boost inductors 530, 534, 538 is continuous despite operating the auxiliary stage in the DCM mode.

This continuous input current feature reduces the current stresses on the active power switches when compared to the prior art. Consequently, this topology can accommodate higher power levels due to its reduced current stresses on the switches. Further, since the input currents conduct at all times and mimic the sinusoidal input voltage waveform, the input current harmonics are reduced and the THD is improved since the sinusoidal waveform has zero harmonics. Thus, with improved THD, the current gaps experienced by the prior art (see FIG. 1) are effectively reduced or even eliminated.

Figure 6:
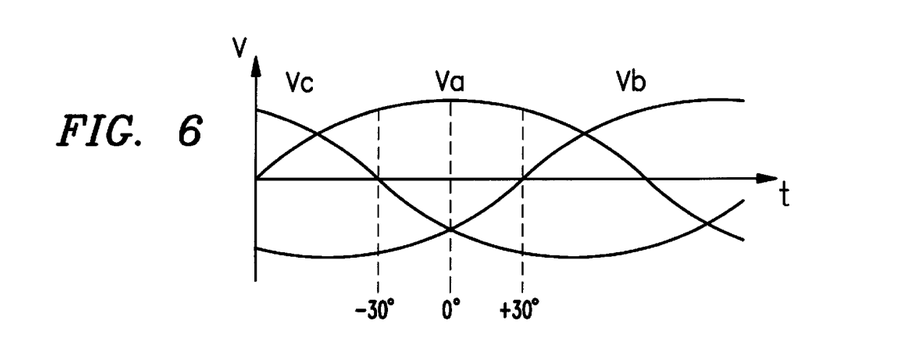
FIG. 6 illustrates exemplary three-phase input voltage waveforms for the converter of FIG. 5.

Turning now to FIG. 6, illustrated are exemplary three-phase input voltage waveforms for the converter of FIG. 5. The input voltages of the converter exhibit a repeating 60° symmetry. An interval from −30° to 30° is merely two sub-intervals (−30° to 0°, 0° to 30°) reflected about the 0° point. During the 0°–30° sub-interval, Va>0 and 0>Vb>Vc. Since the converter switching frequency is much higher than the AC power source line frequency, the three-phase line voltage can be considered as constant during any one switching cycle.

Figure 7A:
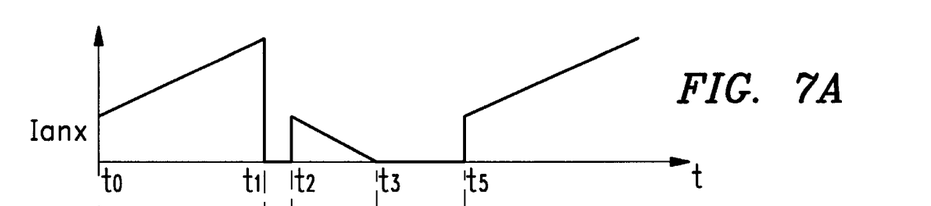
FIGS. 7A–7F illustrate current values for the converter of FIG. 5 during one exemplary switching cycle.
Figure 7B:
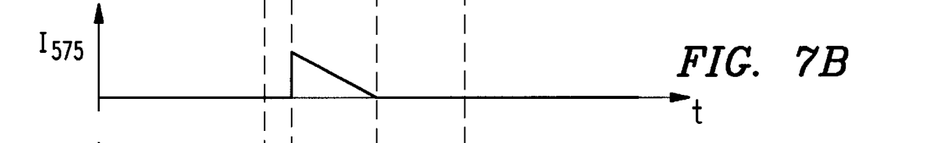
Figure 7C:
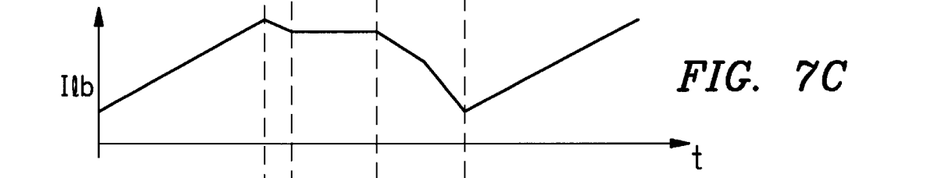
Figure 7D:
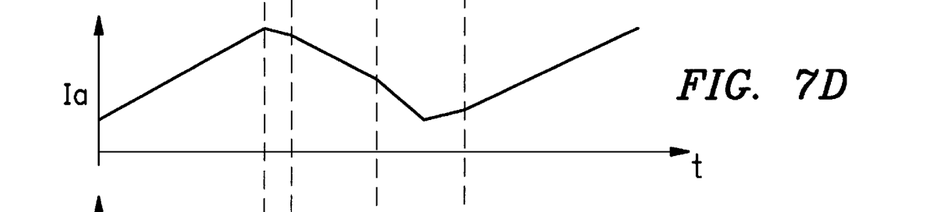
Figure 7E:
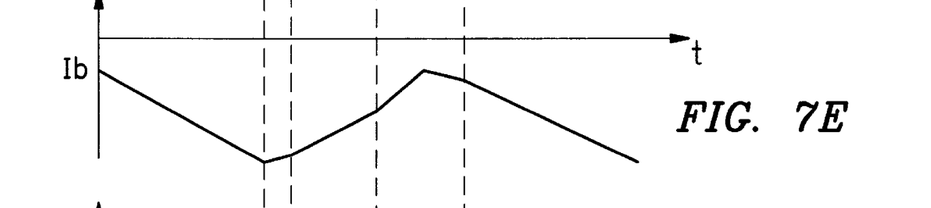
Figure 7F:
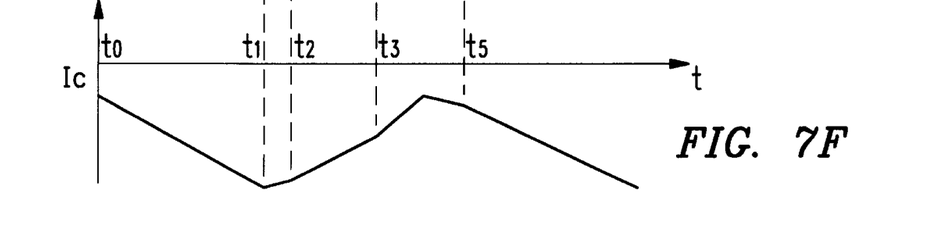

Turning now to FIGS. 7A–7F, illustrated are current values for the converter of FIG. 5 during one exemplary switching cycle. FIG. 7A represents the current through the auxiliary boost switch 570. FIG. 7B represents the current through the auxiliary boost diode 575. FIG. 7C represents the current through the primary boost inductor 565. FIG. 7D represents the current through the first boost inductor 530. FIG. 7E represents the current through the second boost inductor 534. FIG. 7F represents the current through the third boost inductor 538.

Turning now to FIGS. 8A–8D, illustrated are four modes of operation of the converter of FIG. 5 over four time periods. With continuing reference to FIGS. 5, 6 and 7, four modes of operation can be identified within one switching cycle. For simplicity, the input filter (510, 514, 518, 520, 524 and 528) is not shown and the duty cycle of the primary and auxiliary switches 570, 580 are equal (i.e., both switches turn on and off simultaneously).

Figure 8A:
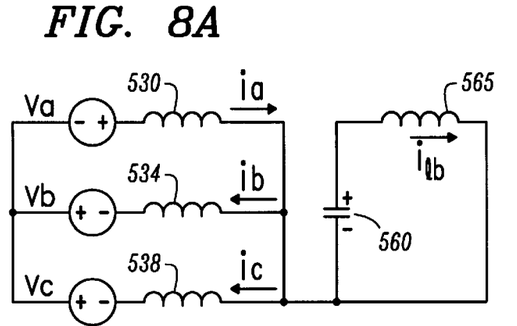
FIGS. 8A–8D illustrate four modes of operation of the converter of FIG. 5 over four time periods.

FIG. 8A shows a first mode during a first time period [t0–t1]. At t0, both switches 570, 580 are turned on. The primary boost inductor 565 is shorted by the primary switch 580 and the primary boost inductor current Ilb is charged up by the filter capacitor 560. At the same time, the first second and third boost inductors 530, 534, 538 are shorted by the auxiliary switch 570. The first boost inductor current Ia begins to increase and is equal to the sum of the second boost inductor current Ib and the third boost inductor current Ic.

Figure 8B:
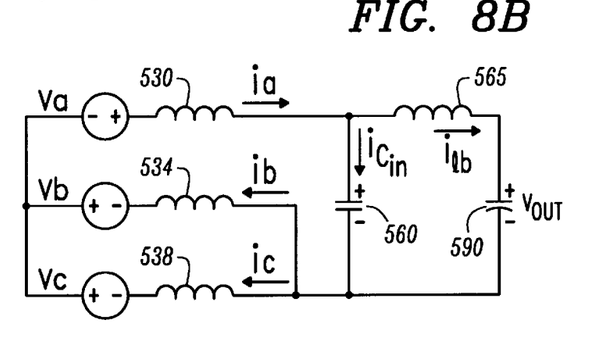

FIG. 8B shows a second mode during a second time period [t1–t2]. At t1, both switches 570, 580 are turned off, per PWM control requirements. Since the primary boost inductor 565 is larger than the first boost inductor 530 and the filter capacitor has a small value, the first boost inductor current Ia is larger than the primary boost inductor current Ilb. Additionally, the first boost inductor current Ia will start to charge the capacitance of the auxiliary switch 570. During the first mode, the energy stored in the filter capacitor 560 has been discharged by way of the primary boost inductor 565. Resultingly, the voltage across the filter capacitor 560 is reduced. Once the voltage across the output capacitance of the auxiliary switch 570 is charged up to threshold voltage, a rectifier diode D1 will conduct and the first boost inductor current Ia will begin to charge the filter capacitor 560 and flow through the primary boost inductor 565.

Figure 8C:
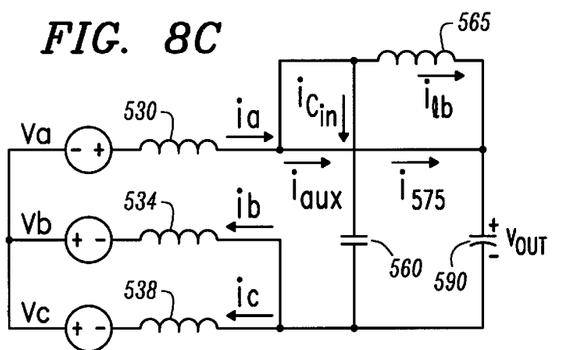

FIG. 8C shows a third mode during a third time period [t2–t3]. At t2, the voltage across the filter capacitor 560 equals the output voltage Vout. Consequently, the rectifier diode D1 and the auxiliary boost diode 575 will conduct. The two diodes D1, 575 further clamp the primary boost inductor voltage to zero volts. As a result, the primary boost inductor current Ilb will remain constant. The auxiliary boost diode 575 conducts the excess current from the first boost inductor 530 and delivers the energy to the output to increase the output voltage Vout.

Figure 8D:
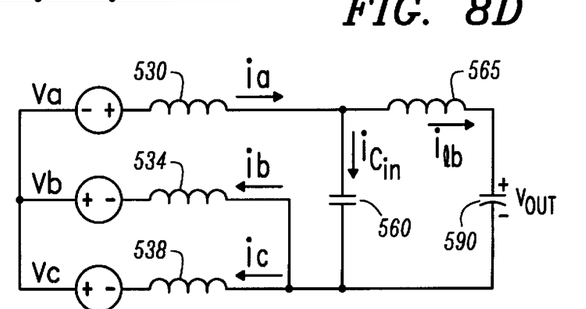

FIG. 8D shows a fourth mode during a fourth time period [t3–t4]. At t3, the current flowing through the auxiliary boost diode I575 reaches zero and the first boost inductor current Ia equals the primary boost inductor current Ilb. During this operating mode, the converter operates like a conventional single-switch CCM three-phase boost converter in an "off" mode. Multi-resonant transitions between the filter capacitor 560 and the primary boost inductor 565 as well between the first, second and third boost inductors 530, 534, 538 exist.

Once this mode ends, the switching cycle begins anew. As can be seen, the current through the auxiliary boost diode I575 reaches zero before the auxiliary switch 570 turns on. As a result, the auxiliary boost diode 575 does not experience reverse recovery, thus minimizing the diode loss and boost switch turn-on loss. Further, since the boost inductor currents Ia, Ib, Ic are continuous and the peak values are modulated by input sine wave voltages, the input current waveform quality is improved and the THD is reduced.

Figure 9:
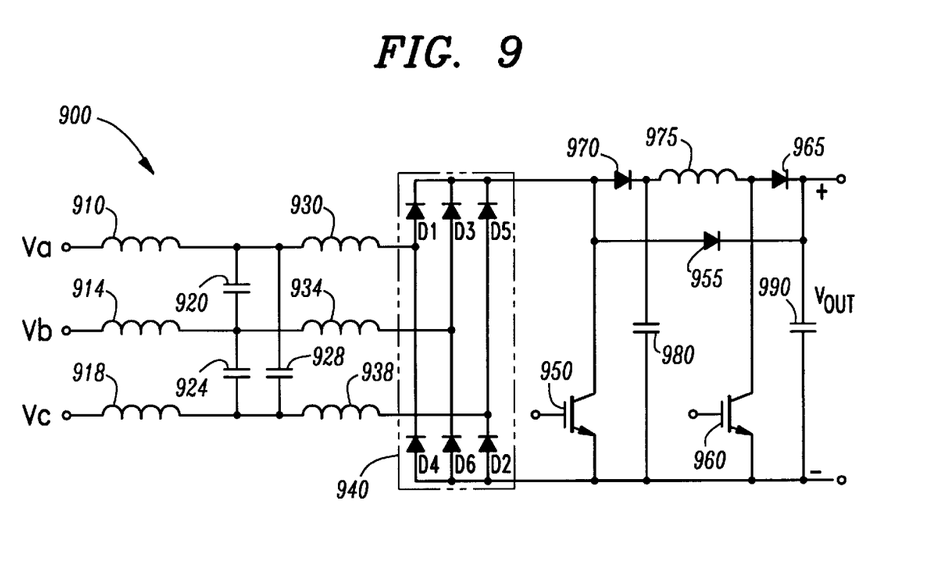
FIG. 9 illustrates another embodiment of a dual-switch, three-phase hybrid control PFC boost converter constructed according to the principles of the present invention.

Turning now to FIG. 9, illustrated is another embodiment of a dual-switch, three-phase hybrid control PFC boost converter 900 constructed according to the principles of the present invention. The converter 900 receives input power from an AC voltage source with three phases (illustrated connected to phase voltages Va, Vb, Vc) through first, second and third filter inductors 910, 914, 918, respectively. A first filter capacitor 920 is coupled between the first and second filter inductors 910, 914 and a second filter capacitor 924 is coupled between the second and third filter inductors 914, 918. Finally, a third filter capacitor 928 is coupled between the first and third filter inductors 910, 918.

First, second and third boost inductors 930, 934, 938 are further coupled to the first, second and third filter inductors 910, 914, 918, respectively. The first, second and third boost inductors 930, 934, 938 are coupled to a three-phase rectifier 940 that includes a plurality of diodes D1–D6 arranged in a bridge configuration.

An auxiliary switch 950 and a filter capacitor 980 are coupled across the three-phase rectifier 940. The filter capacitor 980 acts not only as a filter, but also to store necessary energy. The primary switch 950 is further coupled to a seventh input diode 970 and a auxiliary boost diode 955. An primary boost inductor 975 is coupled to the seventh input diode 970 and is further coupled to a primary boost diode 965. Additionally, a primary switch 960 is coupled to the primary boost diode 965. Finally, the auxiliary and primary boost diodes 955, 965 are both coupled to an output capacitor 990, across which, an output voltage Vout is regulated. Inasmuch as the converter 900 operates analogously to the converter 500 of FIG. 5, a detailed explanation of the operation will not hereinafter be described.

While specific embodiments of a power converter and a method of reducing input current THD have been illustrated and described, other embodiments are well within the broad scope of the present invention. For a better understanding of switching power supplies, in general, see "Principles of Power Electronics" by John G. Kassakian, et al., Addison Wesley, Inc. (1991), and for boost topologies, see, "Simple High Performance Three-Phase Boost Rectifiers" by Y. Jiang, et al., pp. 39–44, 1994 Vpec Seminar Proceeding (1994), "An Active Power Factor Correction Technique for Three-Phase Diode Rectifiers" by A. R. Prasad, et al., pp.58–66, 1989 IEEE PESC proceedings (1989), "A Single Transistor Three-Phase Resonant Switch for High Quality Rectification" by E. Ismail & R. W. Ericson, pp.1342–1351, 1992 IEEE PESC Proceeding (1992) and "Optimum PWM Pattern for A 3-Phase Boost DCM PFC rectifier" by R. Zhang & F. C. Lee, pp.35–42, 1996 VPEC Annual Seminar proceeding (1996), which are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a three-phase boost converter having a primary stage with a primary rectifier, primary boost inductor, primary boost diode and a primary boost switch coupled between an input and output of said three-phase boost converter, and operable in a continuous conduction mode (CCM), an auxiliary stage, comprising:

first, second and third auxiliary boost inductors coupled to corresponding phases of said input;

an auxiliary rectifier coupled to said first, second and third auxiliary boost inductors; and an auxiliary boost switch, interposed between said auxiliary rectifier and said output, that conducts to induce corresponding phase currents through said first, second and third auxiliary boost inductors thereby reducing input current total harmonic distortion (THD) at said input of said three-phase boost converter.

2. The auxiliary stage as recited in claim 1 wherein said auxiliary boost switch transitions to a conducting state concurrently with said primary boost switch.

3. The auxiliary stage as recited in claim 1 wherein said three-phase boost converter further includes an input EMI filter.

4. The auxiliary stage as recited in claim 1 further comprising an auxiliary boost diode coupled between said auxiliary boost switch and said output.

5. The auxiliary stage as recited in claim 1 wherein said primary rectifier comprises a six-diode bridge.

6. A three-phase boost converter having an input and an output, comprising:

a primary stage with a primary rectifier, primary boost inductor, primary boost diode and a primary boost switch coupled between said input and said output;

an auxiliary stage, including:
first, second and third auxiliary boost inductors coupled to corresponding phases of said input;
an auxiliary rectifier coupled to said first, second and third auxiliary boost inductors; and
an auxiliary boost switch, interposed between said auxiliary rectifier and said output, that conducts to induce corresponding phase currents through said first, second and third auxiliary boost inductors thereby reducing input current total harmonic distortion (THD) at said input of said three-phase boost converter.

7. The three-phase boost converter as recited in claim 6 wherein said auxiliary boost switch transitions to a conducting state concurrently with said primary boost switch.

8. The three-phase boost converter as recited in claim 6 wherein said auxiliary stage further comprises an auxiliary boost diode coupled between said auxiliary boost switch and said output.

9. The three-phase boost converter as recited in claim 6 wherein said primary rectifier comprises a six-diode bridge.

10. The three-phase boost converter as recited in claim 6 further comprising an input EMI filter.

11. For use with a three-phase boost converter having a primary stage with a primary rectifier, primary boost inductor, primary boost diode and a primary boost switch coupled between an input and output of said three-phase boost converter, and operable in a continuous conduction mode (CCM),, a method of reducing input current total harmonic distortion (THD) at said input of said three-phase boost converter, comprising:

coupling first, second and third auxiliary boost inductors to corresponding phases of said input;

coupling an auxiliary rectifier to said first, second and third auxiliary boost inductors;

interposing an auxiliary boost switch of said auxiliary stage between said auxiliary rectifier and said output; and controlling said auxiliary boost switch to induce corresponding phase currents through said first, second and third auxiliary boost inductors thereby reducing said input current THD.

12. The method as recited in claim 11 wherein said primary rectifier comprises a six-diode bridge.

13. The method as recited in claim 11 further comprising filtering an input voltage of said three-phase boost converter.

14. The method as recited in claim 11 wherein said controlling comprises transitioning said auxiliary boost switch to a conducting state concurrently with said primary boost switch.

15. The method as recited in claim 11 further comprising coupling an auxiliary boost diode of said auxiliary stage between said auxiliary boost switch and said output.

* * * * *